United States Patent
Kaila et al.

(10) Patent No.: US 12,106,135 B2
(45) Date of Patent: Oct. 1, 2024

(54) DISTRIBUTED AUTONOMOUS LIFECYCLE MANAGEMENT OF HYPERVISORS IN A VIRTUALIZED COMPUTING SYSTEM

(71) Applicant: VMware, Inc., Palo Alto, CA (US)

(72) Inventors: Ashish Kaila, Cupertino, CA (US); Suresh Sundriyal, Mountain View, CA (US); Mukund Gunti, Sunnyvale, CA (US)

(73) Assignee: VMware LLC, Palo Alto, CA (US)

( * ) Notice: Subject to any disclaimer, the term of this patent is extended or adjusted under 35 U.S.C. 154(b) by 520 days.

(21) Appl. No.: 17/367,118

(22) Filed: Jul. 2, 2021

(65) Prior Publication Data

US 2023/0004413 A1    Jan. 5, 2023

(51) Int. Cl.
*G06F 9/455* (2018.01)
(52) U.S. Cl.
CPC ................. *G06F 9/45558* (2013.01)
(58) Field of Classification Search
CPC ............ G06F 9/45558; G06F 9/45533
See application file for complete search history.

(56) References Cited

U.S. PATENT DOCUMENTS

| | | | |
|---|---|---|---|
| 9,860,311 B1* | 1/2018 | Rohde | G06F 11/3433 |
| 10,365,922 B1* | 7/2019 | Wang | G06F 21/57 |
| 11,188,364 B1* | 11/2021 | Sundaresan | G06F 8/41 |
| 2016/0188421 A1* | 6/2016 | Karinta | G06F 16/188 |
| | | | 707/654 |
| 2019/0319839 A1* | 10/2019 | Nozhchev | G06F 8/65 |
| 2020/0177451 A1* | 6/2020 | Easterling | G06F 9/5055 |
| 2021/0004000 A1* | 1/2021 | Kalaskar | G06F 9/45545 |
| 2023/0136522 A1* | 5/2023 | Jain | G06F 11/30 |
| | | | 711/154 |

* cited by examiner

*Primary Examiner* — Benjamin C Wu
(74) *Attorney, Agent, or Firm* — Kim & Stewart LLP

(57) ABSTRACT

An example method of hypervisor lifecycle management in a virtualized computing system having a cluster of hosts is described. The method includes: obtaining, by remediation software executing in a host of the hosts, a host state document from a distributed key-value store, the host state document defining a desired state of software in the host, the software including a hypervisor; and performing, by the remediation software in coordination with other hosts of the hosts through the distributed key-value store, a lifecycle operation on the software of the host in response to determining that a current state of the software does not match the desired state.

20 Claims, 4 Drawing Sheets

DISTRIBUTED AUTONOMOUS LIFECYCLE MANAGEMENT OF HYPERVISORS IN A VIRTUALIZED COMPUTING SYSTEM

Applications today are deployed onto a combination of virtual machines (VMs), containers, application services, and more within a software-defined datacenter (SDDC). The SDDC includes a server virtualization layer having clusters of physical servers that are virtualized and managed by virtualization management servers. Each host includes a virtualization layer (e.g., a hypervisor) that provides a software abstraction of a physical server (e.g., central processing unit (CPU), random access memory (RAM), storage, network interface card (NIC), etc.) to the VMs. A virtual infrastructure administrator ("VI admin") interacts with a virtualization management server to create server clusters ("host clusters"), add/remove servers ("hosts") from host clusters, deploy/move/remove VMs on the hosts, deploy/configure networking and storage virtualized infrastructure, and the like. The virtualization management server sits on top of the server virtualization layer of the SDDC and treats host clusters as pools of compute capacity for use by applications.

A hypervisor lifecycle includes patching and upgrading the base operating system (OS), patching and upgrading the installed software, and managing the configuration of the hypervisor. It is desirable to perform these operations in a manner such that the VMs running on the hypervisor are not affected. A hypervisor can include a maintenance mode where the VMs running thereon are migrated to other host(s) in the cluster with spare capacity, which frees the hypervisor to be patched/upgraded/configured without affecting VM operations. Apart from VMs, there are other considerations, such as availability constraints of distributed storage solutions that add additional constraints on the number of hypervisors in the cluster that can concurrently be in the maintenance mode.

In order to meet all these constraints, a virtualized computing system can include an external coordination engine to select candidate hosts that can be remediated concurrently and determine the order in which the hosts are remediated. Such external coordination engines, however, become a central point of failure. In addition, such external coordination engines fail to scale as the number of hosts in the cluster increases.

SUMMARY

An example method of hypervisor lifecycle management in a virtualized computing system having a cluster of hosts is described. The method includes: obtaining, by remediation software executing in a host of the hosts, a host state document from a distributed key-value store, the host state document defining a desired state of software in the host, the software including a hypervisor; and performing, by the remediation software in coordination with other hosts of the hosts through the distributed key-value store, a lifecycle operation on the software of the host in response to determining that a current state of the software does not match the desired state.

Further embodiments include a non-transitory computer-readable storage medium comprising instructions that cause a computer system to carry out the above methods, as well as a computer system configured to carry out the above methods.

DETAILED DESCRIPTION

Distributed autonomous lifecycle management of hypervisors in a virtualized computing system is described. In embodiments, the techniques described herein remove the dependence on an external coordination engine to perform hypervisor lifecycle management. The techniques allow the hosts in the cluster to autonomously coordinate and perform their own hypervisor lifecycle operations. In embodiments, the techniques leverage a distributed key-value store (DKVS) in the host cluster to coordinate the hypervisor lifecycle operations. The DKVS provides high availability, redundancy, and fault tolerance, which allows these operations to scale with the number of hosts in the cluster. In embodiments, the hypervisor software and its configuration are specified using a declarative human-readable form that can be formulated by a user in a state document. In embodiments, the remediation logic for hyper-visor lifecycle operations is disposed in the hosts themselves. Given a desired state document, a host can remediate itself to conform to the specified state without interaction with an external coordination engine. In embodiments, the information about which hosts have which software images available is stored in the DKVS. This allows hosts to download software images without using a centralized repository. Rather, the hosts can use a peer-to-peer mechanism to maximize parallelism and increase throughput of image downloads. These and further aspects of the techniques are described below with respect to the drawings.

Figure 1:
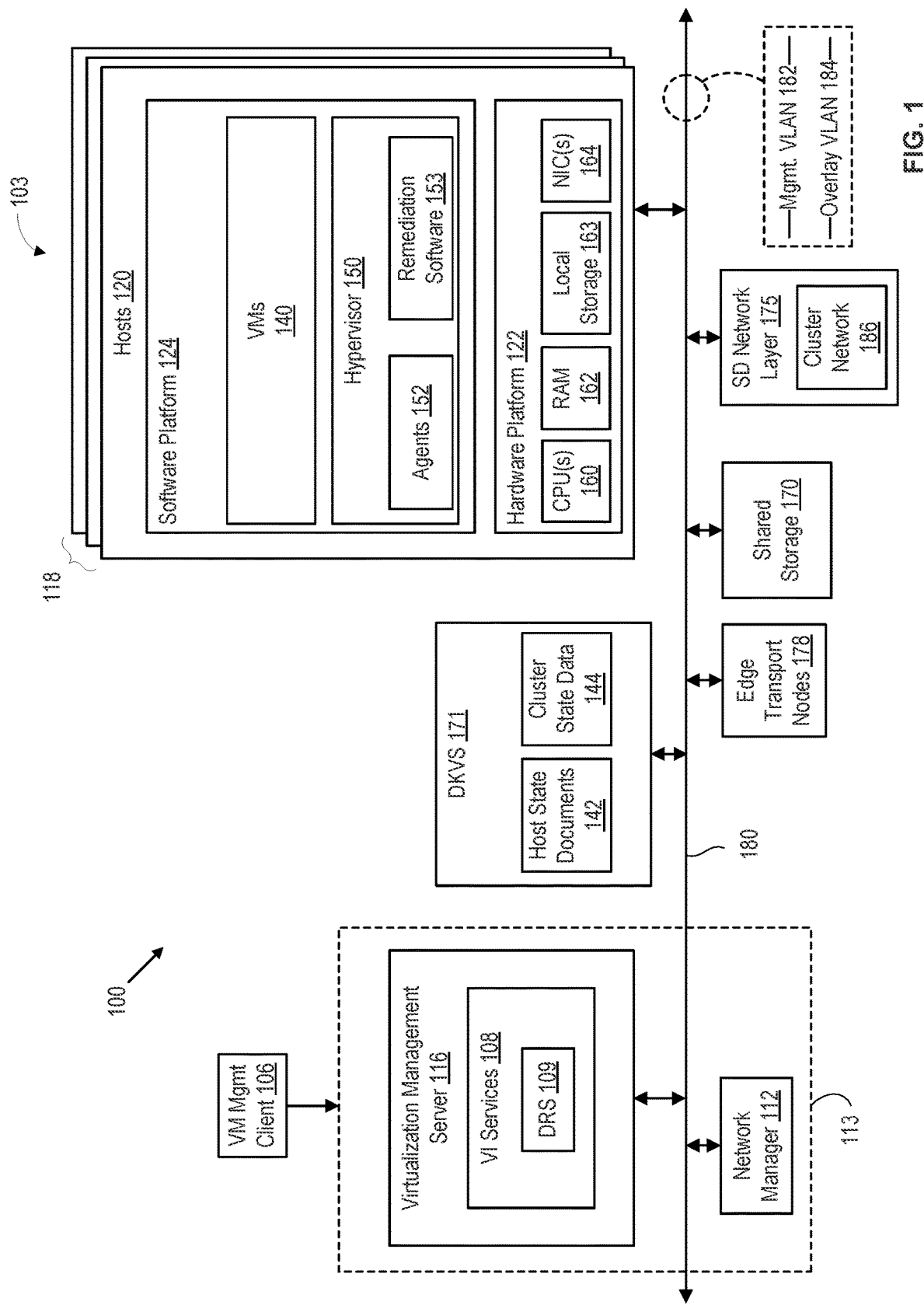
FIG. 1 is a block diagram of a virtualized computing system in which embodiments described herein may be implemented.

FIG. 1 is a block diagram of a virtualized computing system 100 in which embodiments described herein may be implemented. System 100 includes a cluster of hosts 120 ("host cluster 118") that may be constructed on server-grade hardware platforms such as an x86 architecture platforms. For purposes of clarity, only one host cluster 118 is shown. However, virtualized computing system 100 can include many of such host clusters 118. As shown, a hardware platform 122 of each host 120 includes conventional components of a computing device, such as one or more central processing units (CPUs) 160, system memory (e.g., random access memory (RAM) 162), one or more network interface controllers (NICs) 164, and optionally local storage 163. CPUs 160 are configured to execute instructions, for example, executable instructions that perform one or more operations described herein, which may be stored in RAM 162. NICs 164 enable host 120 to communicate with other devices through a physical network 180. Physical network 180 enables communication between hosts 120 and between other components and hosts 120 (other components discussed further herein). Physical network 180 can include a plurality of VLANs to provide external network virtualization as described further herein.

In the embodiment illustrated in FIG. 1, hosts 120 access shared storage 170 by using NICs 164 to connect to network 180. In another embodiment, each host 120 contains a host bus adapter (HBA) through which input/output operations (IOs) are sent to shared storage 170 over a separate network (e.g., a fibre channel (FC) network). Shared storage 170 include one or more storage arrays, such as a storage area network (SAN), network attached storage (NAS), or the like. Shared storage 170 may comprise magnetic disks, solid-state disks (SSDs), flash memory, and the like as well as combinations thereof. In some embodiments, hosts 120 include local storage 163 (e.g., hard disk drives, solid-state drives, etc.). Local storage 163 in each host 120 can be aggregated and provisioned as part of a virtual SAN (VSAN), which is another form of shared storage 170. Virtualization management server 116 can select which local storage devices in hosts 120 are part of a vSAN for host duster 118.

A software platform 124 of each host 120 provides a virtualization layer, referred to herein as a hypervisor 150, which directly executes on hardware platform 122. In an embodiment, there is no intervening software, such as a host operating system (OS), between hypervisor 150 and hardware platform 122, Thus, hypervisor 150 is a Type-1 hypervisor (also known as a "bare-metal" hypervisor 9. As a result, the virtualization layer in host duster 118 (collectively hypervisors 150) is a bare-metal virtualization layer executing directly on host hardware platforms. Hypervisor 150 abstracts processor, memory, storage, and network resources of hardware platform 122 to provide a virtual machine execution space within which multiple virtual machines (VM) 140 may be concurrently instantiated and executed. One example of hypervisor 150 that may be configured and used in embodiments described herein is a VMware ESXi™ hypervisor provided as part of the VMware vSphere® solution made commercially available by VMware, Inc. of Palo Alto, CA An embodiment of software platform 124 is discussed further below with respect to FIG. 2.

In embodiments, host duster 118 is configured with a software-defined (SD) network layer 175. SD network layer 175 includes logical network services executing on virtualized infrastructure in host cluster 118. The virtualized infrastructure that supports the logical network services includes hypervisor-based components, such as resource pools, distributed switches, distributed switch port groups and uplinks, etc., as well as VM-based components, such as router control VMs, load balancer VMs, edge service VMs, etc. Logical network services include logical switches, logical routers, logical firewalls, logical virtual private networks (VPNs), logical load balancers, and the like, implemented on top of the virtualized infrastructure. In embodiments, virtualized computing system 100 includes edge transport nodes 178 that provide an interface of host cluster 118 to an external network (e.g., a corporate network, the public Internet, etc.). Edge transport nodes 178 can include a gateway between the internal logical networking of host cluster 118 and the external network. Edge transport nodes 178 can be physical servers or VMs.

Virtualization management server 116 is a physical or virtual server that manages host cluster 118 and the virtualization layer therein. Virtualization management server 116 installs agent(s) 152 in hypervisor 150 to add a host 120 as a managed entity. Virtualization management server 116 logically groups hosts 120 into host cluster 118 to provide cluster-level functions to hosts 120, such as VM migration between hosts 120 (e.g., for load balancing), distributed power management, dynamic VM placement according to affinity and anti-affinity rules, and high-availability. The number of hosts 120 in host cluster 118 may be one or many. Virtualization management server 116 can manage more than one host cluster 118.

In an embodiment, virtualized computing system 100 further includes a network manager 112. Network manager 112 is a physical or virtual server that orchestrates SD network layer 175. In an embodiment, network manager 112 comprises one or more virtual servers deployed as VMs. Network manager 112 installs additional agents 152 in hypervisor 150 to add a host 120 as a managed entity, referred to as a transport node. In this manner, host cluster 118 can be a cluster 103 of transport nodes. One example of an SD networking platform that can be configured and used in embodiments described herein as network manager 112 and SD network layer 175 is a VMware NSX® platform made commercially available by VMware Inc. of Palo Alto, CA.

Network manager 112 can deploy one or more transport zones in virtualized computing system 100, including VLAN transport zone(s) and an overlay transport zone. A VLAN transport zone spans a set of hosts 120 (e.g., host cluster 118) and is backed by external network virtualization of physical network 180 (e.g., a VLAN). One example VLAN transport zone uses a management VLAN 182, on physical network 180 that enables a management network connecting hosts 120 and the VI control plane (e.g., virtualization management server 116 and network manager 112). An overlay transport zone using overlay VLAN 184 on physical network 180 enables an overlay network that spans a set of hosts 120 (e.g., host cluster 118) and provides internal network virtualization using software components (e.g., the virtualization layer and services executing in VMs). Host-to-host traffic for the overlay transport zone is carried by physical network 180 on the overlay VLAN 184 using layer-2-over-layer-3 tunnels. Network manager 112 can configure SD network layer 175 to provide a cluster network 186 using the overlay network. The overlay transport zone can be extended into at least one of edge transport nodes 178 to provide ingress/egress between cluster network 186 and an external network.

Virtualization management server 116 and network manager 112 comprise a virtual infrastructure (VI) control plane 113 of virtualized computing system 100. In embodiments, network manager 112 is omitted and virtualization management server 116 handles virtual networking. Virtualization management server 116 can include VI services 108. VI services 108 include various virtualization management services, such as a distributed resource scheduler (DRS) 109, high-availability (HA) service, single sign-on (SSO) service, virtualization management daemon, vSAN service, and the like. DRS 109 is configured to aggregate the resources of host cluster 118 to provide resource pools and enforce resource allocation policies. DRS 109 also provides resource management in the form of load balancing, power management, VM placement, and the like. HA service is configured to pool VMs and hosts into a monitored cluster and, in the event of a failure, restart VMs on alternate hosts in the cluster. A single host is elected as a master, which communicates with the HA service and monitors the state of protected VMs on subordinate hosts. The HA service uses admission control to ensure enough resources are reserved in the cluster for VM recovery when a host fails. SSO service comprises security token service, administration server, directory service, identity management service, and the like configured to implement an SSO platform for authenticating users. The virtualization management daemon is configured to manage objects, such as data centers, clusters, hosts, VMs, resource pools, datastores, and the like.

A VI admin can interact with virtualization management server 116 through a VM management client 106. Through VM management client 106, a VI admin commands virtualization management server 116 to form host cluster 118, configure resource pools, resource allocation policies, and other cluster-level functions, configure storage and networking, and the like.

Hypervisor 150 further includes remediation software 153 for performing lifecycle operations on hypervisor 150. Remediation software 153 in hypervisor 150 removes the dependence on an external coordination engine and allows hosts 120 to autonomously coordinate and perform their own lifecycle operations. Lifecycle operations include patching and upgrading the base operating system, patching and upgrading installed software, managing the configuration of hypervisor 150, and the like.

Virtualized computing system 100 includes a distributed key-value store (DKVS) 171. In embodiments, DKVS 171 comprises software executing in a plurality of VMs 140. For purposes of clarity, DKVS 171 is shown as a separate logical component in FIG. 1. In embodiments, remediation software 153 leverages DKVS 171 to coordinate lifecycle operations. DKVS 171 provides high availability, redundancy, and fault tolerance that allows the lifecycle operations to scale with the number of hosts 120 in host cluster 118. Users create host state documents 142, which are stored in DKVS 171. For example, users can interact with virtualization management server 116 using VM management client 106 to define or provide host state documents 142. Virtualization management server 116 can store host state documents 142 in DKVS 171. Each host state document 142 defines software and configuration for hypervisor 150 in a host in a declarative, human-readable form.

According to embodiments, software installation bundles (SABs), more generally referred to herein as payloads, are logically grouped into "components." In the embodiments, a component is a unit of shipment and installation, and a successful installation of a component typically will appear to the end user as enabling some specific feature of hypervisor 150. For example, if a software vendor wants to ship a user-visible feature that requires a plug-in, a driver, and a solution, the software vendor will create separate payloads for each of the plug-in, the driver, and the solution, and then group them together as one component. From the end user's perspective, it is sufficient to install this one component onto a server to enable this feature on the server. A component may be part of another software image, such as a base image or an add-on, as further described below, or it may be a stand-alone component provided by a third-party or the end user (hereinafter referred to as "user component").

A "base image" is a collection of components that are sufficient to boot up a server with the virtualization software. For example, the components for the base image include a core kernel component and components for basic drivers and in-box drivers. The core kernel component is made up of a kernel payload and other payloads that have inter-dependencies with the kernel payload. According to embodiments, the collection of components that make up the base image is packaged and released as one unit.

An "add-on" car "add-on image" is a collection of components that the OEM wants to bring together to customize its servers. Using add-ons, the OEM can add, update or remove components that are present in the base image. The add-on is layered on top of the base image and the combination includes all the drivers and solutions that are necessary to customize, boot up and monitor the OEM's servers. Although an "add-on" is always layered on top of a base image, the add-on content and the base image content are not, tied together. As a result, an OEM is able to independently manage the lifecycle of its releases. In addition, end users can update the add-on content and the base image content independently of each other.

"Solutions" are features that indirectly impact the desired image when they are enabled by the end user. In other words, the end-user decides to enable the solution in a user interface but does not decide what components to install. The solution's management layer decides the right set of components based on constraints. Examples solutions include HA (high availability), and NSX (network virtualization platform of VMware, Inc.).

One example form for expressing the desired state is a host state document 142. A host state document can define (1) base image, (2) add-on, (3) solution, (4) user component (s), and (5) firmware package, and the like for hypervisor 150 and its host 120. As discussed further below, remediation software 153 can obtain or be notified of a host state document 142 for its respective host 120 and perform lifecycle operations in case the current state of host 120 differs from the desired state specified in host state document 142. In embodiments, DRS 109 stores some of its data as cluster state data 144 in DKVS 171, Remediation software 153 can access cluster state data 144 during lifecycle operations to perform health checks on host cluster 118, as discussed further below.

Figure 2:
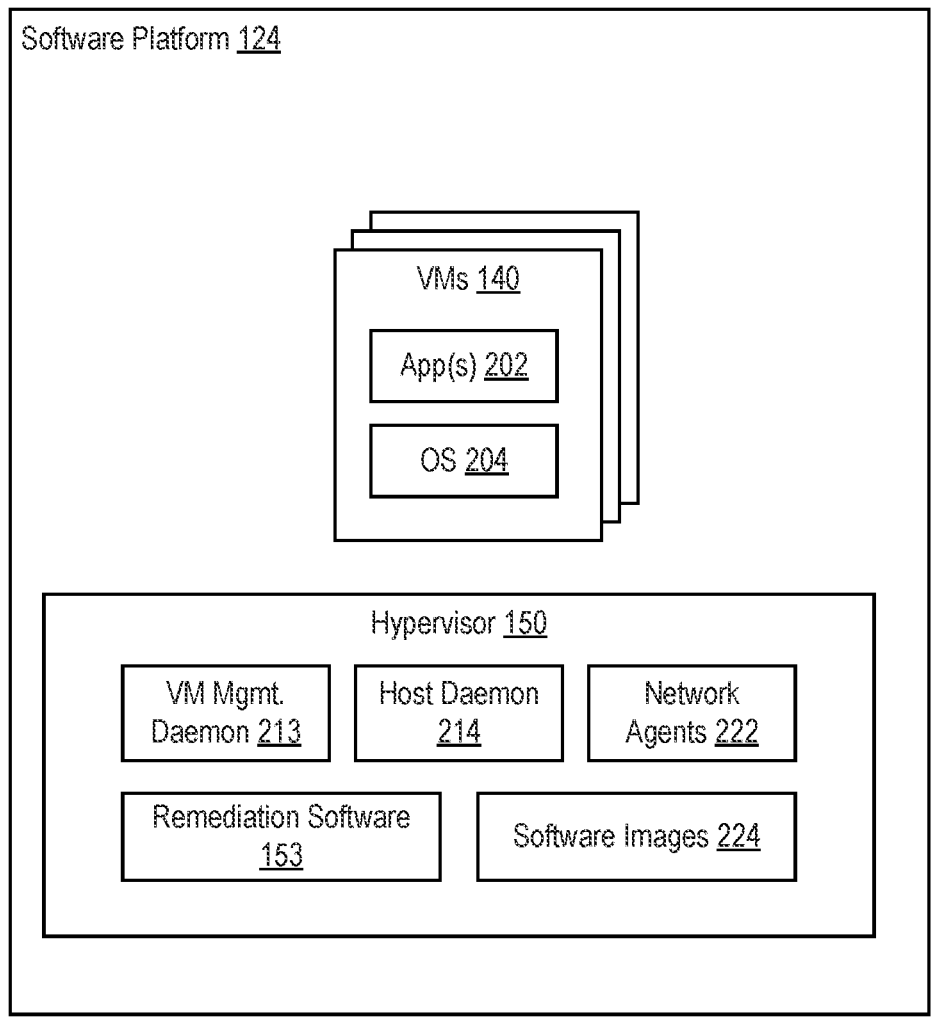
FIG. 2 is a block diagram depicting a software platform according to an embodiment.

FIG. 2 is a block diagram depicting software platform 124 according to an embodiment. As described above, software platform 124 of host 120 includes hypervisor 150 that supports execution of VMs 140. In an embodiment, hypervisor 150 includes a VM management daemon 213, a host daemon 214, and remediation software 153. VM management daemon 213 is an agent 152 installed by virtualization management server 116. VM management daemon 213 provides an interface to host daemon 214 for virtualization management server 116. Host daemon 214 is configured to create, configure, and remove VMs. Network agents 222 comprises agents 152 installed by network manager 112. Network agents 222 are configured to cooperate with network manager 112 to implement logical network services. Network agents 222 configure the respective host as a transport node in a cluster 103 of transport nodes. Each VM 140 has applications 202 running therein on top of an OS 204. Remediation software 153 performs lifecycle operations on hypervisor 150 as discussed further herein. Hypervisor 150 is installed on host 120 from a software image 224, which can include a collection of SIBs for the base OS and software executing thereon (e.g., addons). Software platform 124 can include one or more software images 224 (stored on host 120, e.g., in local storage).

Figure 3:
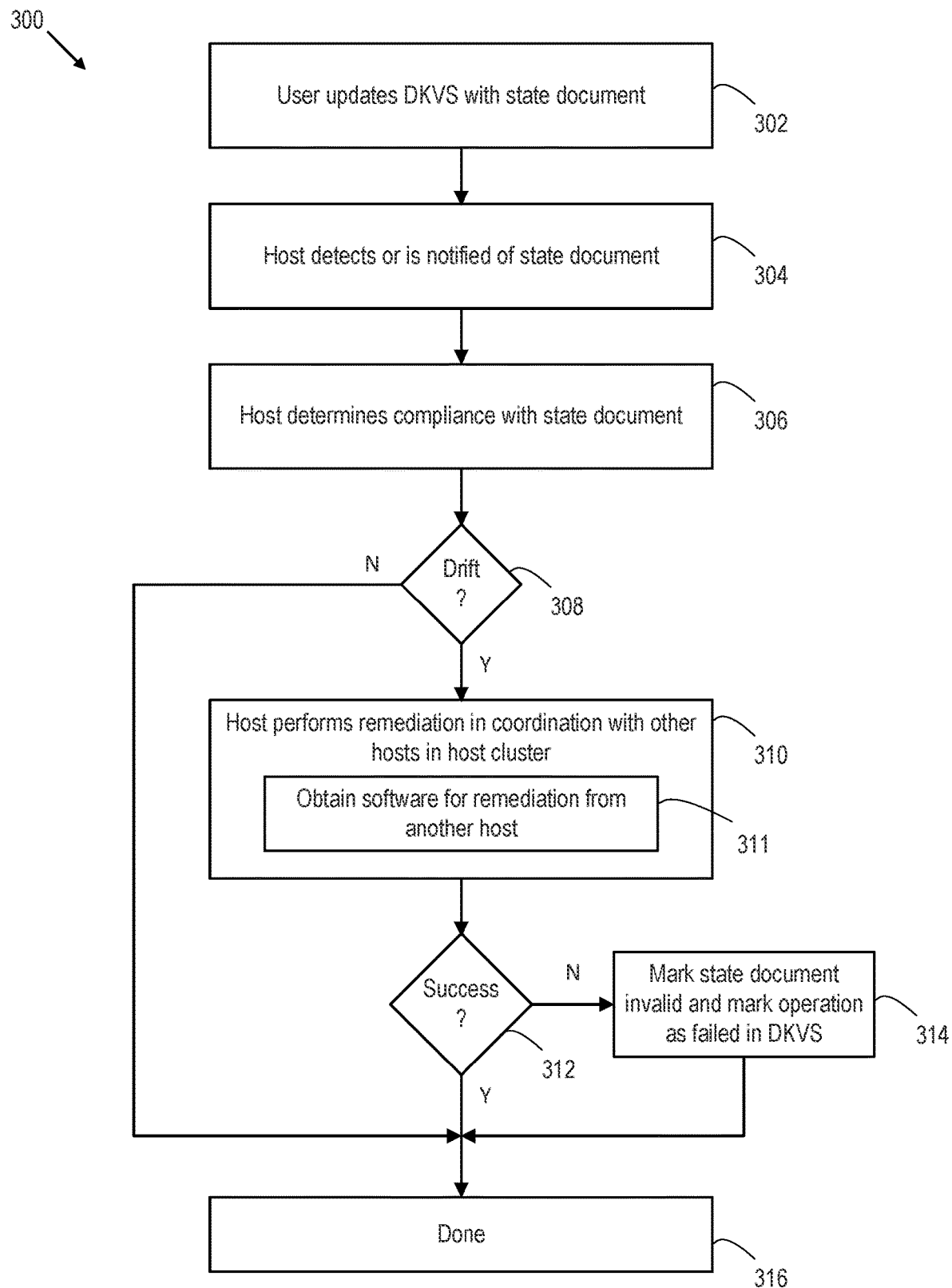
FIG. 3 is a flow diagram depicting a method of autonomous lifecycle management for a hypervisor according to an embodiment.

FIG. 3 is a flow diagram depicting a method 300 of autonomous lifecycle management for a hypervisor according to an embodiment. Method 300 begins at step 300, where a user updates DKVS 171 with a host state document 142. In embodiments, the user interacts with virtualization management server 116, which in turn stores a host state document 142 in DKVS 171. In embodiments, host state document 142 declaratively specifies the target OS/software version hypervisor 150 needs to be patched/upgraded to; an optional location where patches/upgraded software can be obtained; and any configuration changes required on host 120 (e.g., configuration changes for hypervisor 150).

At step 304, remediation software 153 in a host 120 detects or is notified of host state document 142. For example, remediation software 153 can periodically monitor DKVS 171 to determine if a new host state document is available. In another example, remediation software 153 can receive a notification from DKVS 171 or virtualization management server 116 that a new host state document is available.

At step 306, remediation software 153 determines compliance of hypervisor 150 with host state document 142. If hypervisor 150 is already in compliance with host state document at step 308, the method 300 ends at step 316. If at step 308 hypervisor 150 is in drift with respect to host state document 142, method 300 proceeds instead to step 310.

At step 310, remediation software 153 performs remediation in coordination with other hosts 120 in host cluster 118. Embodiments of the remediation process are described below with respect to FIG. 4. In an embodiment, at step 311, remediation software 153 obtains software for remediation from another host in host cluster 118. For example, remediation software 153 can determine from information in DKVS 171 the location of software for updating/patching hypervisor 150 for the remediation operation (e.g., a software image 224). Remediation software 153 can then request and obtain a software image 224 from another host for use in the remediation operation. In another embodiment, remediation software 153 can obtain a software image 224 from a repository (e.g., identified in the host state document).

At step 312, remediation software 153 determines if the remediation operation is successful. If not, method 300 proceeds to step 314, where remediation software 153 marks host state document 142 as invalid and updates DKVS 171 with information indicating that the remediation operation for host 120 has failed. Method 300 then ends at step 316. If at step 312 the remediation operation is successful, method 300 ends at step 316.

Figure 4:
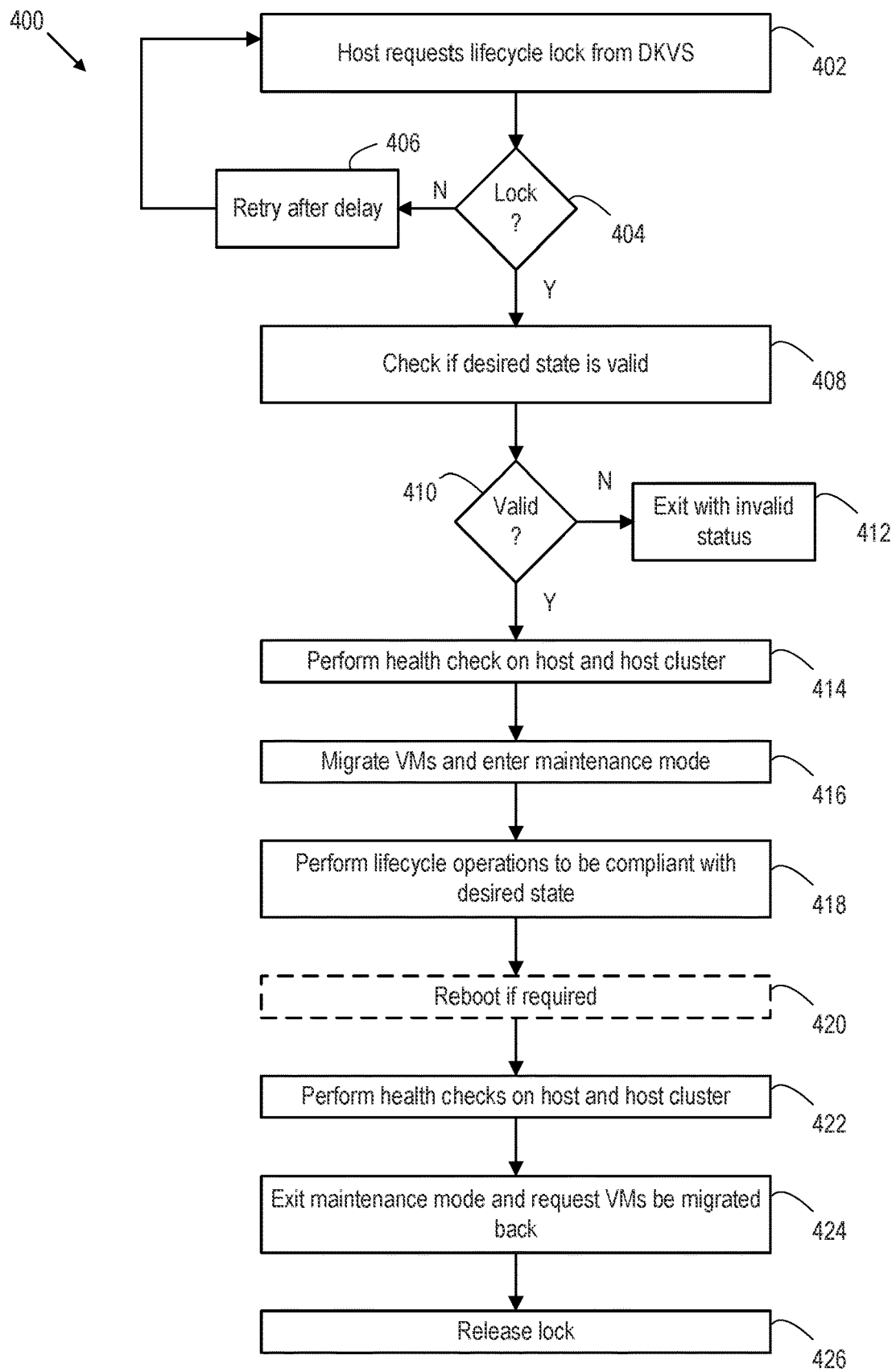
FIG. 4 is a flow diagram depicting a method of remediation of a host according to an embodiment.

FIG. 4 is a flow diagram depicting a method 400 of remediation of a host according to an embodiment. Method 400 begins at step 402, where remediation software 153 requests a lifecycle lock from DKVS 171. DKVS 171 can store information that determines how many hosts 120 can perform lifecycle operations concurrently. Remediation software 153 can examine such information in DKVS 171 to determine if it is free to perform lifecycle operations. If at step 404 a lock cannot be obtained, method 400 proceeds to step 406, where remediation software 153 can retry obtaining the lock after a delay. If at step 404 a lifecycle lock has been obtained, method 400 proceeds to step 408.

At step 408, remediation software 153 determines if host state document 142 is valid. For example, remediation software 153 can check the desired state specified in host state document 142 for any errors. If at step 410 host state document 142 is invalid, method 400 proceeds to step 412, where remediation software 153 exists with invalid status indicating that the remediation operation is not successful. If at step 410 host state document 142 is valid, method 400 proceeds to step 414.

At step 414, remediation software 153 performs a health check of host 120 and host cluster 118. Remediation software 153 can obtain cluster state data 144 from DKVS 171 when determining health of host cluster 118. Example health checks of host 120 include host connectivity, whether all required software services are up and running, and the like. Example health checks of host cluster 118 include vSAN cluster health, any distributed storage availability checks, and the like. At step 416, remediation software 153 requests migration of VMs 140 from host 120 to oiler host(s) 120 in host cluster 118 and requests hypervisor 150 enter into maintenance mode. Maintenance mode for hypervisor 150 allows hypervisor 150 to perform lifecycle operations.

At step 418, remediation software 153 executes one or more lifecycle operations to make hypervisor 150 compliant with the desired state as specified in host state document 142. Example lifecycle operations include upgrading/patching the base OS, upgrading/patching installed software (e.g., addons), and changing the configuration of hypervisor 150. At step 420, if a reboot is required to implement the changes, remediation software 153 requests a reboot. At step 422, remediation software 153 executes health checks on host 120 and host cluster 118. Health checks performed in step 422 may be the same or similar to those performed in step 414. However, in step 422, hypervisor 150 has had its state changed to match the desired state in host state document 142.

At step 424, remediation software 153 requests exit of the maintenance mode and requests migration of VMs back to host 120. At step 426, remediation software 153 releases the lifecycle lock obtained at step 402.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of hypervisor lifecycle management in a virtualized computing system having a cluster of hosts, the method comprising:
    obtaining, by remediation software executing in a host of the hosts, a host state document from a distributed key-value store, the host state document defining a desired state of software in the host, the software including a hypervisor;
    entering a maintenance mode of the hypervisor;
    performing, by the remediation software in coordination with other hosts of the hosts through the distributed key-value store during the maintenance mode, a lifecycle operation on the software of the host in response to determining that a current state of the software does not match the desired state; and
    exiting the maintenance mode of the hypervisor after the lifecycle operation.

2. The method of claim 1, wherein the step of performing comprises:
    requesting, by the remediation software, a lifecycle lock from the distributed key-value store.

3. The method of claim 2, wherein the step of performing further comprises:
    executing a health check of the host before entering the maintenance mode, after executing the lifecycle operation, or both before entering the maintenance mode and after executing the lifecycle operation.

4. The method of claim 2, wherein the step of performing further comprises:
    obtaining cluster state data from the distributed key-value store at the remediation software; and
    executing a health check on the host cluster using the cluster state data before entering the maintenance mode, after executing the lifecycle operation, or both before entering the maintenance mode and after executing the lifecycle operation.

5. The method of claim 1, wherein the desired state of the hypervisor in the host state document includes at least one of a desired version of a base operating system (OS), a desired version of software executing on the base OS, and a configuration of the hypervisor.

6. The method of claim 1, wherein the host state document specifies a repository having software for use in the lifecycle operation, and wherein the step of performing comprises obtaining the software from the repository for use with the lifecycle operation.

7. The method of claim 1, further comprising:
    determining, by the remediation software from the distributed key-value store, another host of the host cluster that stores software for use in the lifecycle operation; and
    obtaining, by the remediation software, the software from the other host for use with the lifecycle operation.

8. A non-transitory computer readable medium comprising instructions to be executed in a computing device to cause the computing device to carry out a method of hypervisor lifecycle management in a virtualized computing system having a cluster of hosts, the method comprising:
    obtaining, by remediation software executing in a host of the hosts, a host state document from a distributed key-value store, the host state document defining a desired state of software in the host, the software including a hypervisor;
    entering a maintenance mode of the hypervisor;
    performing, by the remediation software in coordination with other hosts of the hosts through the distributed key-value store during the maintenance mode, a lifecycle operation on the software of the host in response to determining that a current state of the software does not match the desired state; and
    exiting the maintenance mode of the hypervisor after the lifecycle operation.

9. The non-transitory computer readable medium of claim 8, wherein the step of performing comprises:
    requesting, by the remediation software, a lifecycle lock from the distributed key-value store.

10. The non-transitory computer readable medium of claim 9, wherein the step of performing further comprises:
    executing a health check of the host before entering the maintenance mode, after executing the lifecycle operation, or both before entering the maintenance mode and after executing the lifecycle operation.

11. The non-transitory computer readable medium of claim 9, wherein the step of performing further comprises:
    obtaining cluster state data from the distributed key-value store at the remediation software; and
    executing a health check on the host cluster using the cluster state data before entering the maintenance mode, after executing the lifecycle operation, or both before entering the maintenance mode and after executing the lifecycle operation.

12. The non-transitory computer readable medium of claim 8, wherein the desired state of the hypervisor in the host state document includes at least one of a desired version of a base operating system (OS), a desired version of software executing on the base OS, and a configuration of the hypervisor.

13. The non-transitory computer readable medium of claim 8, wherein the host state document specifies a repository having software for use in the lifecycle operation, and wherein the step of performing comprises obtaining the software from the repository for use with the lifecycle operation.

14. The non-transitory computer readable medium of claim 8, further comprising:
    determining, by the remediation software from the distributed key-value store, another host of the host cluster that stores software for use in the lifecycle operation; and obtaining, by the remediation software, the software from the other host for use with the lifecycle operation.

15. A virtualized computing system having a cluster comprising hosts connected to a network, the virtualized computing system comprising:
   a distributed key-value store configured to store a host state document; and
   a first host of the hosts configured to execute remediation software, the remediation software configured to:
      obtain the host state document from the distributed key-value store, the host state document defining a desired state of software in the first host, the software including a hypervisor;
      enter a maintenance mode of the hypervisor;
      perform, in coordination with other hosts of the hosts through the distributed key-value store during the maintenance mode, a lifecycle operation on the software of the first host in response to determining that a current state of the software does not match the desired state;
      exiting the maintenance mode of the hypervisor after the lifecycle operation.

16. The virtualized computing system of claim 15, wherein the remediation software is configured to perform the lifecycle operation by:
   requesting, by the remediation software, a lifecycle lock from the distributed key-value store.

17. The virtualized computing system of claim 16, wherein the remediation software is configured to perform the lifecycle operation by:
   executing a health check of the host before entering the maintenance mode, after executing the lifecycle operation, or both before entering the maintenance mode and after executing the lifecycle operation.

18. The virtualized computing system of claim 16, wherein the remediation software is configured to perform the lifecycle operation by:
   obtaining cluster state data from the distributed key-value store at the remediation software; and
   executing a health check on the host cluster using the cluster state data before entering the maintenance mode, after executing the lifecycle operation, or both before entering the maintenance mode and after executing the lifecycle operation.

19. The virtualized computing system of claim 15, wherein the desired state of the hypervisor in the host state document includes at least one of a desired version of a base operating system (OS), a desired version of software executing on the base OS, and a configuration of the hypervisor.

20. The virtualized computing system of claim 15, wherein the host state document specifies a repository having software for use in the lifecycle operation, and wherein the step of performing comprises obtaining the software from the repository for use with the lifecycle operation.

* * * * *